(12) United States Patent
Takahashi et al.

(10) Patent No.: US 8,979,123 B1
(45) Date of Patent: Mar. 17, 2015

(54) UTILITY VEHICLE

(71) Applicant: Kawasaki Jukogyo Kabushiki Kaisha, Hyogo (JP)

(72) Inventors: Keiji Takahashi, Akashi (JP); Yoshinori Tsumiyama, Miki (JP)

(73) Assignee: Kawasaki Jukogyo Kabushiki Kaisha, Hyogo (JP)

(*) Notice: Subject to any disclaimer, the term of this patent is extended or adjusted under 35 U.S.C. 154(b) by 0 days.

(21) Appl. No.: 14/095,119

(22) Filed: Dec. 3, 2013

(51) Int. Cl.
*B60R 21/13* (2006.01)

(52) U.S. Cl.
CPC .................................... *B60R 21/13* (2013.01)
USPC .......................................... 280/756; 280/748

(58) Field of Classification Search
USPC ................................................ 280/756, 748
See application file for complete search history.

(56) References Cited

U.S. PATENT DOCUMENTS

| | | | |
|---|---|---|---|
| D439,548 S * | 3/2001 | Kouchi et al. ..................... D12/1 |
| 6,517,111 B2 * | 2/2003 | Mizuta ........................... 280/756 |
| 7,249,798 B2 * | 7/2007 | Saito et al. ..................... 296/205 |
| 7,578,523 B2 * | 8/2009 | Kosuge et al. ................. 280/756 |
| 7,841,639 B2 * | 11/2010 | Tanaka et al. ................ 296/65.05 |
| 7,874,605 B2 * | 1/2011 | Smith et al. ....................... 296/64 |
| 8,079,602 B2 * | 12/2011 | Kinsman et al. ............. 280/5.512 |
| 8,132,827 B2 * | 3/2012 | Bergman et al. .............. 280/748 |
| 8,205,924 B2 * | 6/2012 | Masuda et al. .............. 296/24.43 |
| 8,235,443 B2 * | 8/2012 | Kokawa et al. .............. 296/26.09 |
| 8,322,772 B1 * | 12/2012 | Gilbeck et al. .............. 296/37.15 |
| D675,960 S * | 2/2013 | Hashimoto et al. ............. D12/87 |
| 8,511,732 B2 * | 8/2013 | Inoue et al. ................. 296/26.09 |
| 8,522,911 B2 * | 9/2013 | Hurd et al. ..................... 180/312 |
| 8,550,500 B2 * | 10/2013 | Yamamoto et al. ........... 280/807 |
| 8,556,324 B1 * | 10/2013 | Yamamoto et al. .......... 296/68.1 |
| 8,585,088 B1 * | 11/2013 | Kaku et al. ..................... 280/756 |
| 8,613,337 B2 * | 12/2013 | Kinsman et al. .............. 180/68.3 |
| 8,651,525 B2 * | 2/2014 | Kaku et al. ..................... 280/756 |
| 8,668,236 B1 * | 3/2014 | Yamamoto et al. ......... 296/26.11 |
| 8,684,410 B2 * | 4/2014 | Kwon et al. ................... 280/756 |
| 8,690,217 B2 * | 4/2014 | Yamamoto et al. ........ 296/24.43 |
| 8,714,289 B2 * | 5/2014 | Olsen et al. ................. 180/65.29 |
| 8,752,878 B2 * | 6/2014 | Yamamoto et al. ........ 296/26.08 |
| 2009/0091101 A1 * | 4/2009 | Leonard et al. ............... 280/638 |
| 2009/0121518 A1 * | 5/2009 | Leonard et al. ............ 296/183.1 |
| 2009/0184531 A1 * | 7/2009 | Yamamura et al. .......... 296/37.6 |
| 2009/0302590 A1 * | 12/2009 | Van Bronkhorst et al. ... 280/756 |
| 2011/0298189 A1 * | 12/2011 | Schneider et al. ........... 280/80.1 |
| 2012/0032431 A1 * | 2/2012 | King ............................. 280/756 |
| 2012/0056411 A1 * | 3/2012 | Nakamura et al. ............. 280/756 |
| 2012/0217078 A1 * | 8/2012 | Kinsman et al. .............. 180/69.4 |
| 2014/0084573 A1 * | 3/2014 | Iardella et al. ................. 280/756 |

FOREIGN PATENT DOCUMENTS

JP                64-364         1/1989

* cited by examiner

*Primary Examiner* — Nicole Verley

(74) *Attorney, Agent, or Firm* — Wenderoth, Lind & Ponack, L.L.P.

(57) ABSTRACT

A utility vehicle includes a chassis frame, a single-row seat arranged on the chassis frame, and a rollover protective structure (R.O.P.S.) surrounding a riding space in which the single-row seat is arranged. The R.O.P.S. includes a right side unit and a left side unit, and a plurality of cross members for detachably coupling the right side unit and the left side unit. Each of the right side unit and the left side unit integrally includes a front pole portion, an upper beam portion, a mid pole portion, and a rear pole portion. For each of the right side unit and the left side unit, a lower end of the front pole portion, a lower end of the mid pole portion, and a lower end of the rear pole portion are individually and detachably coupled to the chassis frame.

10 Claims, 9 Drawing Sheets

UTILITY VEHICLE

BACKGROUND OF THE INVENTION

1. Field of the Invention

The present invention relates to a utility vehicle, particularly to a utility vehicle provided with a chassis frame, a single-row seat arranged on the chassis frame, and a R.O.P.S. surrounding a riding space in which the seat is arranged.

2. Description of the Prior Art

In a utility vehicle provided with a single-row seat, a riding space is not wide. Thus, a R.O.P.S. surrounding the riding space is generally formed by a pair of right and left front pole portions arranged in the vicinity of a front end of the riding space, a pair of right and left rear pole portions arranged in the vicinity of a rear end of the riding space, a pair of right and left upper beam portions for coupling upper ends of the front pole portions and upper ends of the rear pole portions, and a plurality of cross portions.

In the utility vehicle, in a case where there is a need for increasing a chassis weight in accordance with a use environment, there is sometimes a case where the number of the pole portions of the R.O.P.S. is increased. FIG. 9 shows a utility vehicle disclosed in Japanese Examined Utility Model Publication No. 64-364, and three pairs of pole portions of a R.O.P.S. are provided. Specifically, the utility vehicle is provided with a chassis frame 101, one seat 102 arranged in a riding space S, and a R.O.P.S. 103 surrounding the riding space S. The R.O.P.S. 103 is formed by a pair of right and left front pole portions 111, a pair of right and left upper beam portions 112, a pair of right and left mid pole portions 113, a pair of right and left rear pole portions 114, and front and rear cross portions 115, 116. The pair of front pole portions 111, the pair of upper beam portions 112, and the front cross portion 115 are integrally formed as one unit U1, and the pair of mid pole portions 113 and the rear cross portion 116 are integrally formed as another unit U2.

In a case where the R.O.P.S. 103 is assembled, rear ends of the pair of upper beam portions 112 of the one unit U1 and an upper end of the other unit U2 are combined by bolts, and the upper end of the other unit U2 and upper ends of the right and left rear pole portions 114 are combined by bolts. Lower ends of the pole portions 111, 113, 114 are combined with attachment portions 116 of the chassis frame 101 by bolts.

In the R.O.P.S. 103 shown in FIG. 9, the three pairs of pole portions 111, 113, 114 are manufactured as separate items, and combined with each other by the bolts. Thus, at the time of assembling, positioning of the lower ends of the pole portions 111, 113, 114 with respect to the attachment portions 116 of the chassis frame 101 takes time and effort. In particular, since the right and left rear pole portions 114 are individually connected to the other unit U2, an assembling task takes time and effort. Since the one unit U1 is three-dimensionally formed, there is a need for a large loading space at the time of transporting parts.

SUMMARY OF THE INVENTION

The present invention has been made in view of the above problem, and an object thereof is to provide a utility vehicle provided with a R.O.P.S. which is easily assembled and readily transported as a part, the R.O.P.S. being capable of maintaining rigidity even in a case where a chassis weight is increased.

In order to solve the above problem, the present invention is a utility vehicle including a chassis frame, a single-row seat arranged on the chassis frame, and a R.O.P.S. surrounding a riding space in which the seat is arranged, wherein the R.O.P.S. is provided with a pair of right and left side units, and a plurality of cross members for detachably coupling both the side units, each of the side units is integrally provided with a front pole portion extending upward from a vicinity of a dashboard, an upper beam portion extending rearward from an upper end of the front pole portion, a mid pole portion extending downward to a vicinity of a rear part of the seat from an intermediate part in the front and rear direction of the upper beam portion, and a rear pole portion extending downward from a rear end of the upper beam portion, and a lower end of the front pole portion, a lower end of the mid pole portion, and a lower end of the rear pole portion are individually and detachably coupled to the chassis frame.

According to the present invention, (1) the front pole portion, the rear pole portion, the mid pole portion, and the upper beam portion positioned on one of the right and left sides are integrally formed as one side unit, the front pole portion, the rear pole portion, the mid pole portion, and the upper beam portion positioned on the other side are integrally formed as another side unit, and both the side units are detachably coupled by the cross members. Thus, assembling is easily performed, and furthermore, rigidity of the R.O.P.S. is maintained.

(2) The front pole portions, the mid pole portions, and the rear pole portions are individually and detachably attached to the chassis frame. Thus, the rigidity of the R.O.P.S. is maintained.

(3) The front pole portion, the rear pole portion, the mid pole portion, and the upper beam portion positioned on one of the right and left sides are integrally formed as one side unit, and the front pole portion, the rear pole portion, the mid pole portion, and the upper beam portion positioned on the other side are integrally formed as another side unit. Thus, both the side units can be formed into a substantially planar shape, and a loading space can be compacted at the time of transporting parts.

The present invention preferably includes the following configurations in the above utility vehicle.

(a) An interval in the front and rear direction between the mid pole portion and the rear pole portion is set to be narrower than an interval in the front and rear direction between the front pole portion and the mid pole portion.

With the above configuration, in a case where a cargo bed is provided in a rear part of the vehicle while maintaining the rigidity of the R.O.P.S., sides of the cargo bed can be widely opened, so that cargo can be easily loaded and unloaded from the sides.

(b) One of the plurality of cross members couples front ends of the right and left upper beam portions, and is formed into a substantially U shape when seen from an upper side so as to project forward from attachment portions in both the ends in a vehicle width direction.

With the above configuration, an upper end space of the riding space is extended to a front part, and at the time of getting in and out of a passenger, a space in a vicinity of a head of the passenger can be widely ensured, so that the passenger can readily get in and out.

(c) One of the plurality of cross members couples the right and left mid pole portions, and is provided with one or a plurality of support portions for supporting a backrest of the seat.

With the above configuration, the number of parts for supporting the backrest can be reduced.

(d) One of the plurality of cross members couples the right and left mid pole portions, and is provided with at least one top anchor attachment portion for a seatbelt.

With the above configuration, in a case of a three-seater seat, a top anchor can be arranged in a vicinity of a shoulder of the passenger as the top anchor attachment portion of a central seat, and this is favorable for attachment of the seatbelt.

(e) A screen for partitioning a cargo bed and the riding space is attached to the right and left mid pole portions.

With the above configuration, the screen is easily attached.

DETAILED DESCRIPTION OF THE PREFERRED EMBODIMENTS

Figure 1:
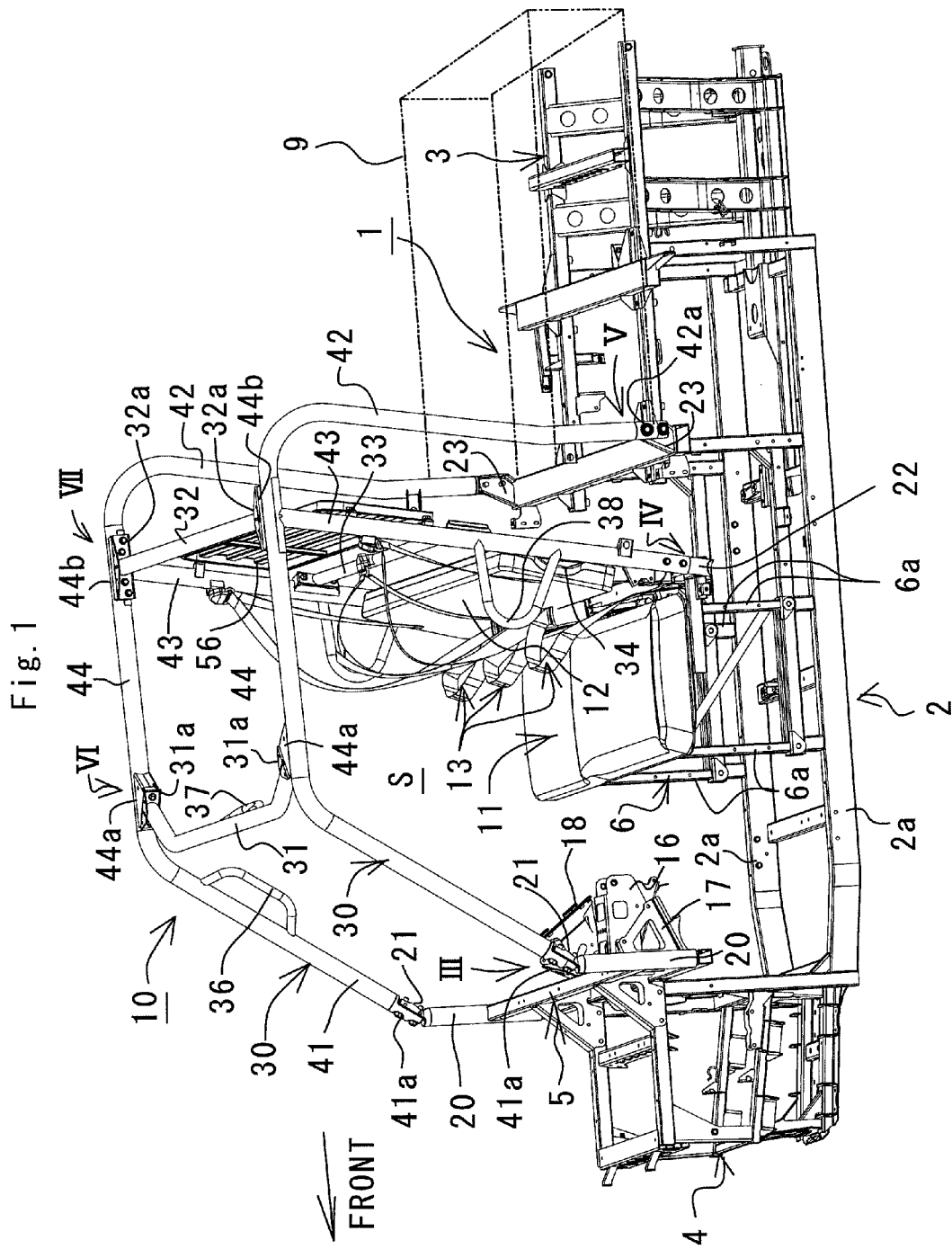
FIG. 1 is a perspective view of a skeleton structure of a utility vehicle according to the present invention when seen from the left upper side.

Based on FIGS. 1 to 8, one embodiment of a utility vehicle according to the present invention will be described. In FIG. 1, a skeleton of the utility vehicle is formed by a chassis frame 1 elongated in a front and rear direction and a R.O.P.S. 10 surrounding a riding space S, and one bench type seat 11 and a backrest 12 thereof are arranged in the riding space S. Instead of the bench type seat 11, there is sometimes a case where a plurality of independent type seats is arranged in a single row. The R.O.P.S. 10 is an abbreviation of a rollover protective structure.

The chassis frame 1 is provided with a main frame 2 having a pair of right and left main frame members 2a extending in the front and rear direction, a rear frame 3 formed in a rear end of the main frame 2, a bonnet frame 4 formed in a front end of the main frame 2, a dashboard frame 5 formed in a front upper end of the main frame 2, and a seat frame 6 arranged in the riding space S. Further, side frames (not shown) are provided on both the right and left sides (both the sides in a vehicle width direction) of the main frame 2.

An area ranging from an upper surface of the rear end of the main frame 2 to an upper surface of the rear frame 3 serves as a cargo bed support area, and a dump truck type cargo bed 9 is arranged on this cargo bed support area. In the main frame 2 and the rear frame 3 on the lower side of the cargo bed support area, an engine and a transmission (not shown) are mounted. In a front end of the cargo bed support area, in order to support a front end of the cargo bed 9, a cargo bed support beam 14 having a rectangular section is provided so as to extend in a lateral direction.

The seat frame 6 has four leg portions 6a, and lower ends of the leg portions 6a are detachably attached to the main frame portion 2. The bench type seat 11 is mounted on an upper surface of the seat frame 6, and has three seating areas aligned in the lateral direction. That is, the bench type seat 11 is three-seater, and three-point seatbelts 13 are respectively arranged in the three seating areas.

A handle support portion 16, a parking brake support portion 17, and a meter attachment portion 18, or the like are provided in the dashboard frame 5. The dashboard frame 5 has vertical pipes 20 in both right and left ends, and front end attachment portions 21 for the R.O.P.S. are provided in upper ends of both the vertical pipes 20. A pair of right and left mid attachment portions 22 for the R.O.P.S. is provided in a rear upper end of the seat frame 6, and a pair of right and left rear end attachment portions 23 for the R.O.P.S. is provided in the cargo bed support beam 14 of the main frame 2.

The R.O.P.S. 10 covering the riding space S is detachably attached to the pair of right and left front end attachment portions 21, the pair of right and left mid attachment portions 22, and the pair of right and left rear end attachment portions 23.

[Structure of R.O.P.S. 10]

The R.O.P.S. 10 is formed by a pair of right and left side units 30 made of metal pipes, and first, second, third, and fourth cross members 31, 32, 33, 34 made of metal pipes for coupling both the side units 30. Each of the side units 30 is integrally provided with a front pole portion 41, a rear pole portion 42, a mid pole portion 43, and an upper beam portion 44. The front pole portion 41, the rear pole portion 42, and the upper beam portion 44 are manufactured by bending one pipe member having a circular section into a substantially U shape in a side view, and the mid pole portion 43 is secured to an intermediate part in the front and rear direction of the upper beam portion 44 by welding. A substantially U shape grip 36 for a right seating area is formed in the front pole portion 41 on the right side, and a substantially U shape grip 37 for a central seating area is formed in the first cross member 31. Further, substantially U shape side guards 38 protruding forward are formed in the right and left mid pole portions 43.

The front pole portions 41 are detachably attached to the front end attachment portions 21 of the dashboard frame 5, and extend upward from the front end attachment portions 21 in a slightly rearward inclined state. The upper beam portions 44 are continued to upper ends of the front pole portions 41 via curved parts, and extend rearward substantially horizontally. The rear pole portions 42 are continued to rear ends of the upper beam portions 44 via curved parts, extend substantially vertically downward, and detachably attached to the rear end attachment portions 23. The mid pole portions 43 are arranged at positions on the rear side of a center part in the front and rear direction of the riding space S, the positions substantially corresponding to the backrest 12 of the seat 11, extend substantially vertically downward, and detachably attached to the mid attachment portions 22 of the seat frame 6. An interval in the front and rear direction between the mid pole portions 43 and the rear pole portions 42 is set to be narrow as, for example, about ⅓ to ¼ of an interval in the front and rear direction between the front pole portions 41 and the mid pole portions 43. In other words, the rear pole portions 42 are arranged at positions where the rear pole portions do not largely project rearward with respect to the mid pole portions 43 arranged at the positions substantially corresponding to the backrest 12, and thereby, spaces on the sides of the cargo bed are largely ensured.

The first cross member 31 has attached portions 31a in both right and left ends, and the attached portions 31a are detachably attached to attachment portions 44a provided in front ends of the upper beam portions 44. The first cross member 31 is formed into a substantially U shape so as to project forward in a plan view. That is, both the right and left ends of the first cross member 31 extend obliquely forward to the inner side in the vehicle width direction from the attached portions 31a, and both the ends of the first cross member 31 are integrally connected to a mid part extending in a substantially straight form in the lateral direction at positions on the front side of the attached portions 31a. Thereby, an upper section of the riding space S is widely ensured.

The second cross member 32 is formed in a substantially straight form, and has attached portions 32a in both right and left ends. Meanwhile, attachment portions 44b are respectively provided at positions corresponding to upper ends of the mid pole portions 43 in the upper beam portions 44. The attached portions 32a in both the right and left ends of the second cross member 32 are detachably attached to the attachment portions 44b.

Figure 2:
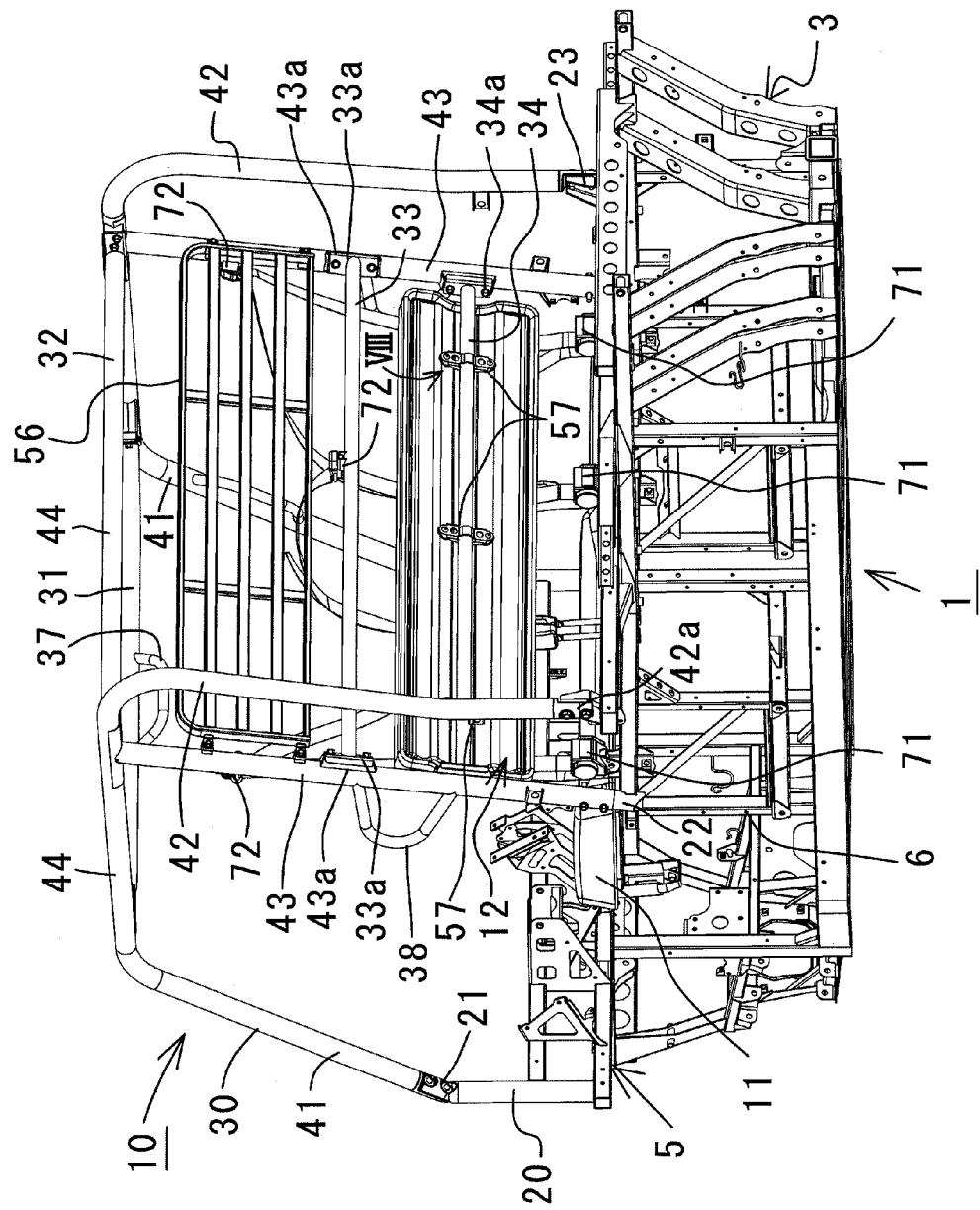
FIG. 2 is a perspective view of the utility vehicle of FIG. 1 when seen from the left rear side.

FIG. 2 is a perspective view of a skeleton of the utility vehicle when seen from the obliquely rear side, and attachment portions 43a for the cross member are provided in substantially center parts in an up and down direction of the mid pole portions 43. Attached portions 33a provided in both right and left ends of the third cross member 33 are detachably attached to the right and left attachment portions 43a by bolts.

A grid form screen 56 is arranged between the second cross member 32 and the third cross member 33 in the up and down direction, and both right and left ends of the screen 56 are detachably attached to both the mid pole portions 43 by bolts.

The fourth cross member 34 is arranged between the third cross member 33 and an upper end of the seat frame 6 in the up and down direction, and attached portions 34a provided in both right and left ends of the fourth cross member 34 are detachably attached to both the mid pole portions 43. Three support brackets 57 for the backrest are secured to the fourth cross member 34 so as to have an interval each other in the lateral direction, and the backrest 12 is supported by the support brackets 57.

Three retractors 71 for the seatbelt are provided in the rear upper end of the seat frame 6 so as to have an interval each other in the lateral direction, and top anchor attachment portions 72 for the seatbelt are respectively provided in upper parts of the mid pole portions 43 and an intermediate part in the lateral direction of the third cross member 33. [Structure of Attaching R.O.P.S. 10 to Chassis Frame 1]

Figure 3:
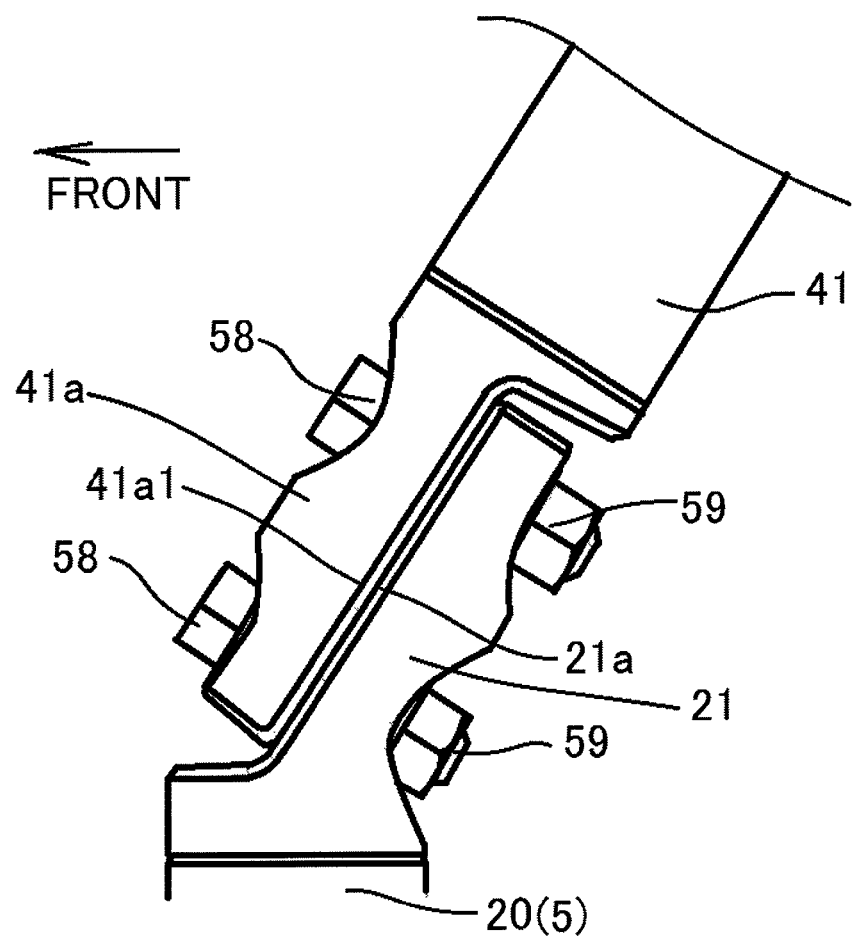
FIG. 3 is an enlarged perspective view of an attachment portion shown by arrow III of FIG. 1.

FIG. 3 shows a structure of attaching a lower end of the front pole portion 41. The lower end of the front pole portion 41 is provided with a halved cylinder shape attached portion 41a, and a planar portion 41a1 of the attached portion 41a faces the rear side. Meanwhile, the front end attachment portion 21 of the vertical pipe 20 of the dashboard frame 5 is also formed into a halved cylinder shape, and a planar portion 21a of the front end attachment portion 21 faces the front side. By overlapping the planar portion 41a1 of the attached portion 41a of the front pole portion 41 with the planar portion 21a of the front end attachment portion 21 of the vertical pipe 20 from the front side, inserting two upper and lower bolts 58 into the attached portion 41a and the front end attachment portion 21 from the front side, and screwing nuts 59 onto the bolts 58 from the rear side, the attached portion 41a is fixed to the front end attachment portion 21.

Figure 4:
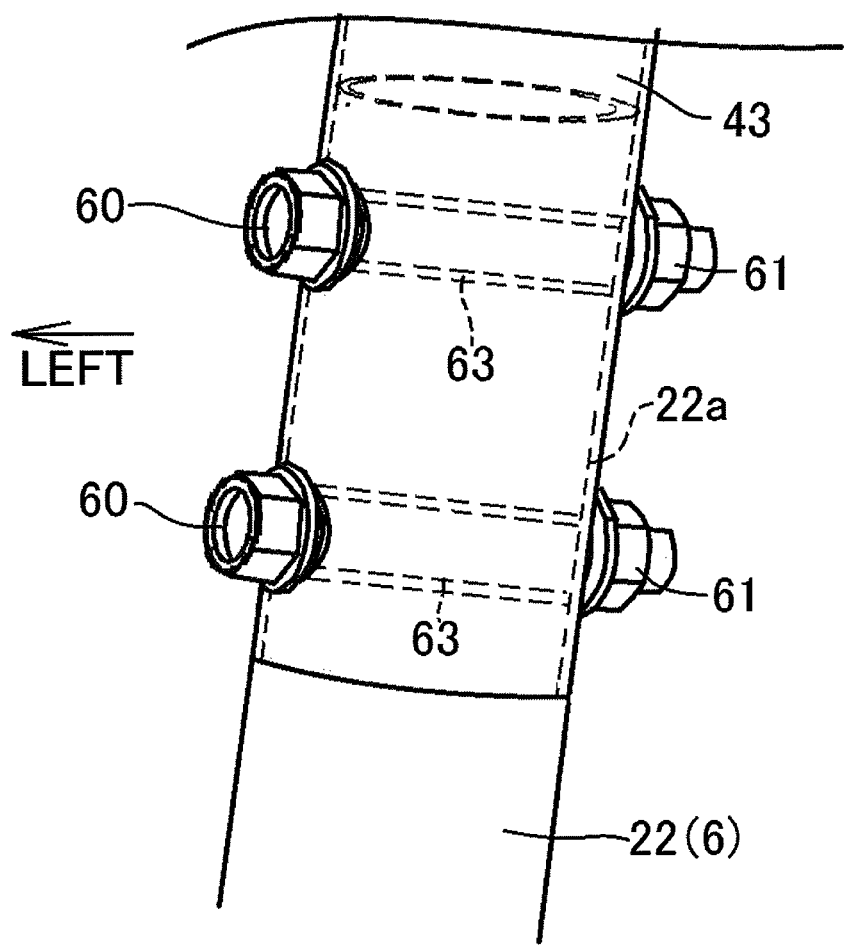
FIG. 4 is an enlarged perspective view of an attachment portion shown by arrow IV of FIG. 1.

FIG. 4 shows a structure of attaching a lower end of the mid pole portion 43. The mid attachment portion 22 provided in the seat frame 6 has a small diameter tube portion 22a having a smaller outer diameter than an outer diameter of the mid attachment portion 22. By fitting the lower end of the mid pole portion 43 to an outer peripheral surface of the small diameter tube portion 22a, inserting two upper and lower bolts 60 into the mid pole portion 43 and the small diameter tube portion 22a from the outer side in the vehicle width direction, and screwing nuts 61 onto the bolts 60 from the inner side in the vehicle width direction, the lower end of the mid pole portion 43 is fixed to the mid attachment portion 22.

Figure 5:
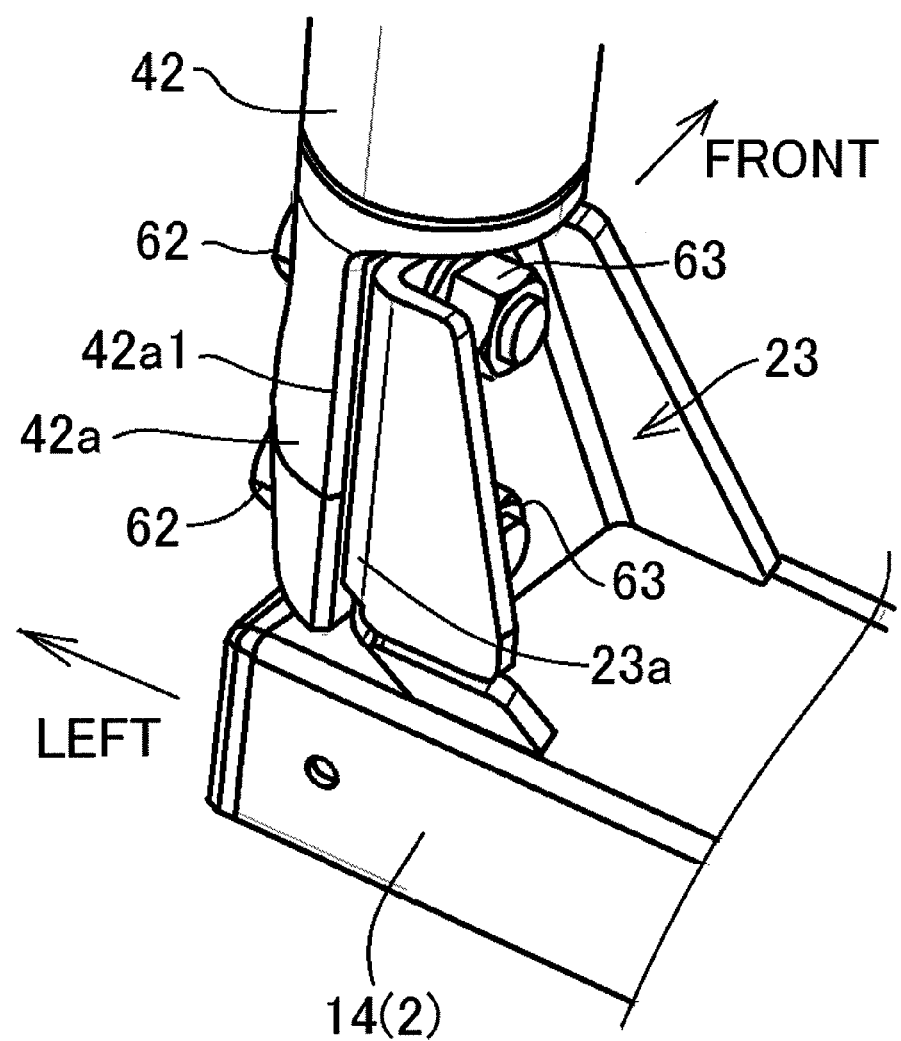
FIG. 5 is an enlarged perspective view of an attachment portion shown by arrow V of FIG. 1.

FIG. 5 shows a structure of attaching a lower end of the rear pole portion 42. The lower end of the rear pole portion 42 is provided with a halved cylinder shape attached portion 42a, and a planar portion 42a1 of this attached portion 42a faces the inner side in the vehicle width direction. Meanwhile, the rear end attachment portion 23 of the cargo bed support beam 14 is formed into a substantially U shape in a plan view, and a planar portion (attachment surface) 23a of the rear end attachment portion 23 faces the outer side in the vehicle width direction. By overlapping the planar portion 42a1 of the attached portion 42a with the planar portion 23a of the rear end attachment portion 23 from the outer side in the vehicle width direction, inserting two upper and lower bolts 62 into the attached portion 42a and the planar portion 23a of the rear end attachment portion 23 from the outer side in the vehicle width direction, and screwing nuts 63 onto the bolts 62 from the inner side in the vehicle width direction, the attached portion 42a of the rear end pole portion 42 is fixed to the rear end attachment portion 23.

Figure 6:
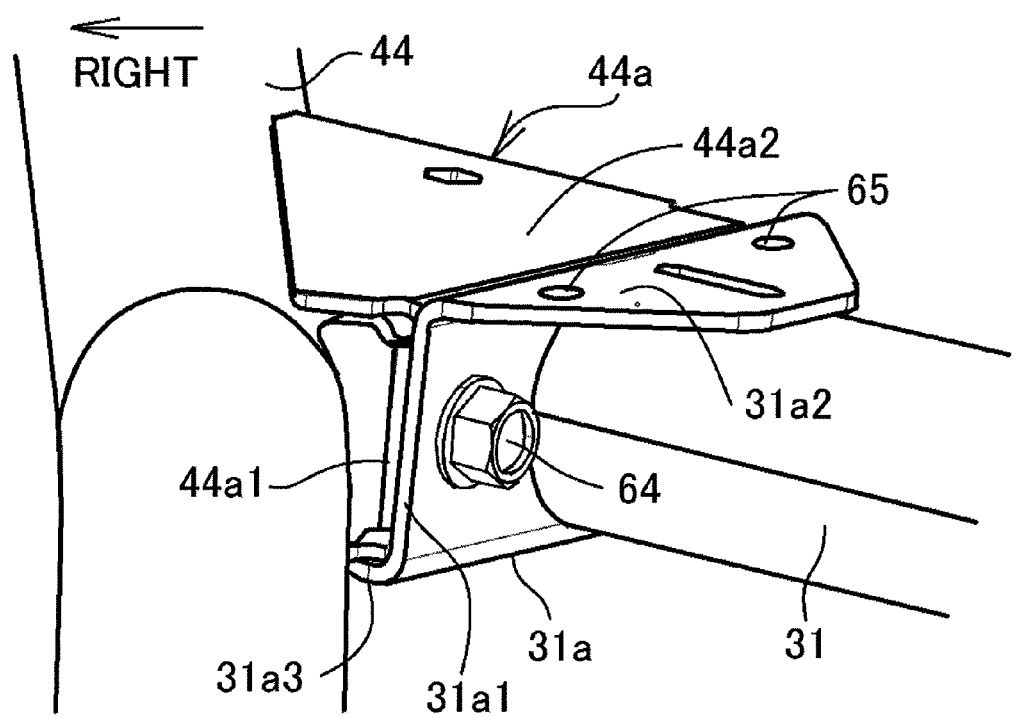
FIG. 6 is an enlarged perspective view of a connection portion shown by arrow VI of FIG. 1.

FIG. 6 shows a structure of connecting the first cross member 31, and the attachment portion 44a provided in the front end of the upper beam portion 44 is formed into a substantially right triangle in a plan view. A main wall portion 44a1 having a substantially vertical attachment surface is inclined with respect to a vertical plane substantially parallel to the upper beam portion 44 in such a manner that a rear end thereof is positioned on the inner side in the vehicle width direction of a front end thereof. A nut (not shown) is welded to a back surface of the main wall portion 44a1. The attached portion 31a provided in the end of the first cross member 31 has a substantially vertical main wall portion 31a1, a substantially horizontal upper wall portion 31a2 integrally formed in an upper end of the main wall portion 31a1, and a lower wall portion 31a3 formed in a lower end of the main wall portion 31a1, and has a substantially S shape section. By overlapping the main wall portion 31a1 of the attached portion 31a of the first cross member 31 with the main wall portion 44a1 of the attachment portion 44a from the obliquely front side, inserting two bolts 64 into both the main wall portions 31a1, 44a1 from the obliquely front side, and screwing the bolts into welding nuts, the first cross member 31 is connected to the upper beam portion 44.

In a state that the first cross member 31 is connected to the upper beam portion 44, the upper wall portion 44a2 of the attachment portion 44a and the upper wall portion 31a2 of the attached portion 31a are placed on the substantially same horizontal plane, and these upper wall portions 44a2, 31a2 can be utilized as attachment surfaces of a ceiling member. Therefore, bolt insertion holes 65 for attaching the ceiling member or the like are formed in the upper wall portions 44a2, 31a2.

Figure 7:
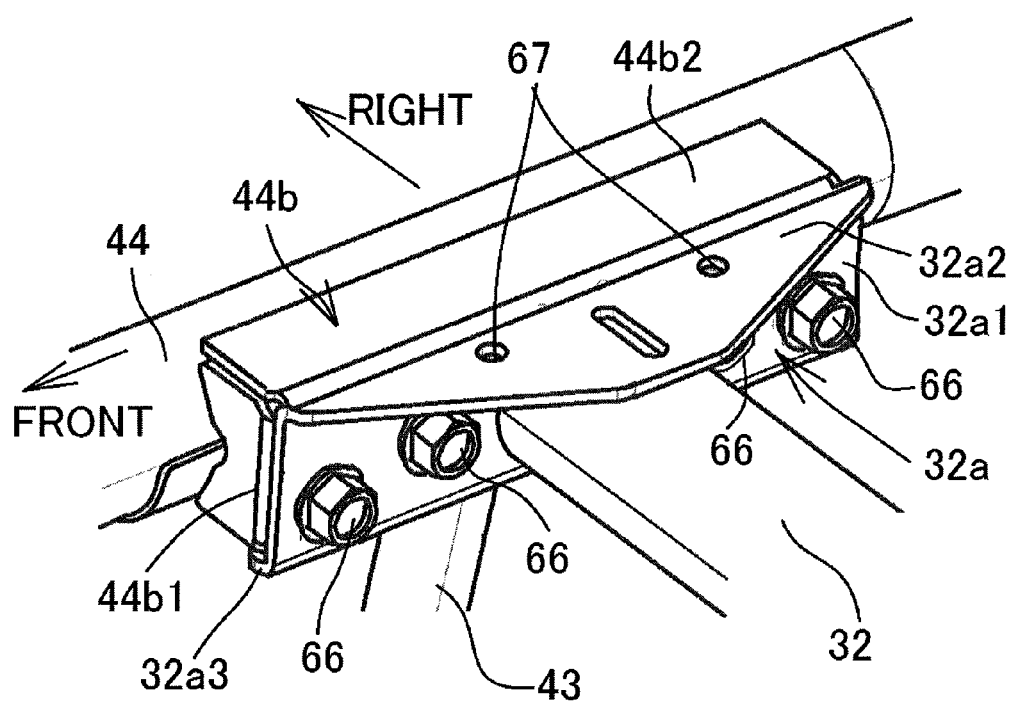
FIG. 7 is an enlarged perspective view of a connection portion shown by arrow VII of FIG. 1.

FIG. 7 shows a structure of connecting the second cross member 32, and a shape of the attachment portion 44b in a plan view is different from a case of the first cross member 31 of FIG. 6. That is, the attachment portion 44b provided in the upper beam portion 44 is provided with a main wall portion 44b1 having a substantially vertical attachment surface. However, the main wall portion 44b1 is arranged in a vertical plane substantially parallel to the upper beam portion 44, and faces the inner side in the vehicle width direction. Other structures are similar to the case of the first cross member 31 of FIG. 6. That is, a nut (not shown) is welded to a back surface of the main wall portion 44b1 of the attachment portion 44b, and the attached portion 32a provided in the end of the second cross member 32 has a substantially vertical main wall portion 32a1, a substantially parallel upper wall portion 32a2 integrally formed in an upper end of the main wall portion 32a1, and a lower wall portion 32a3 formed in a lower end of the main wall portion 32a1, and has a substantially S shape section. By overlapping the main wall portion 32a1 of the attached portion 32a of the second cross member 32 with the main wall portion 44b1 of the attachment portion 44b from the inner side in the vehicle width direction, inserting four bolts 66 into both the main wall portions 32a1, 44b1 from the inner side in the vehicle width direction, and screwing the bolts into welding nuts, the second cross member 32 is connected to the upper beam portion 44.

Figure 8:
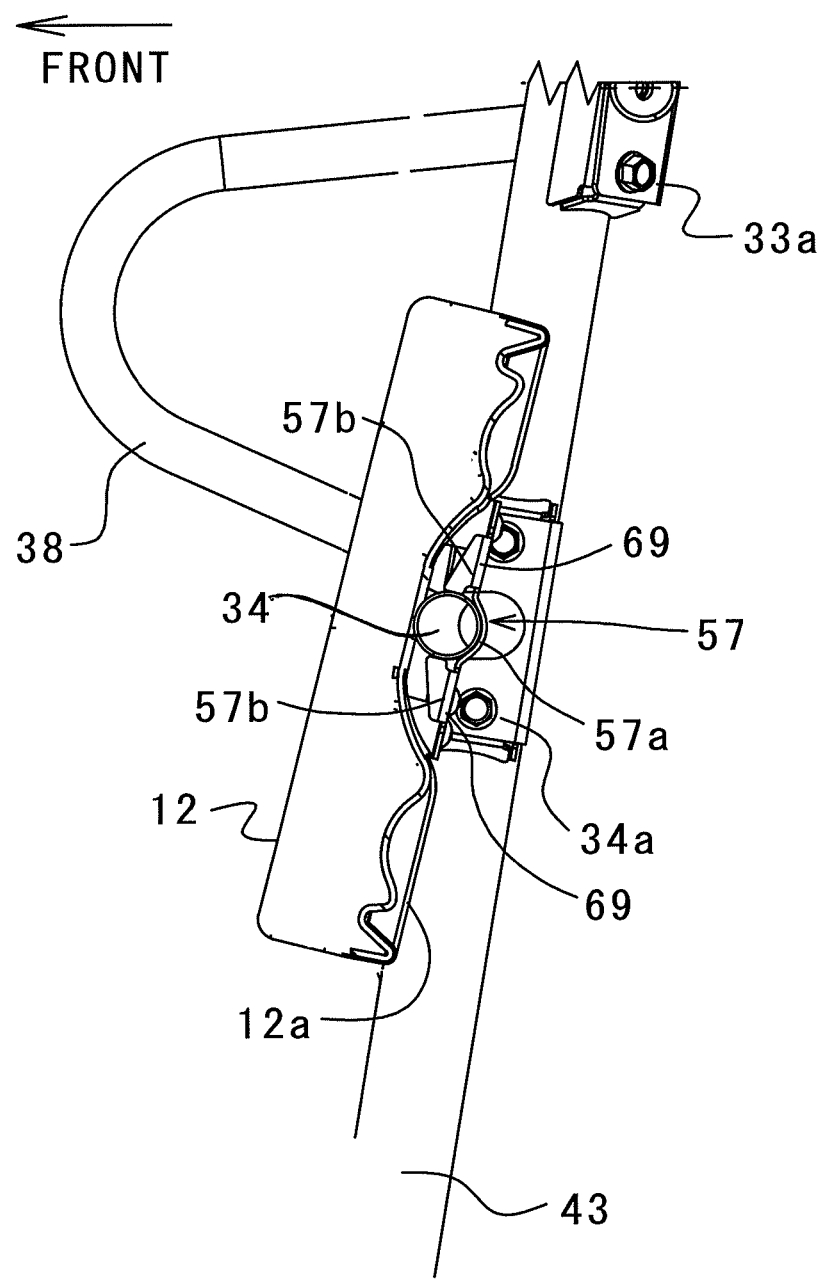
FIG. 8 is a vertically sectional view of an arrow VIII part of FIG. 2.
Figure 9:
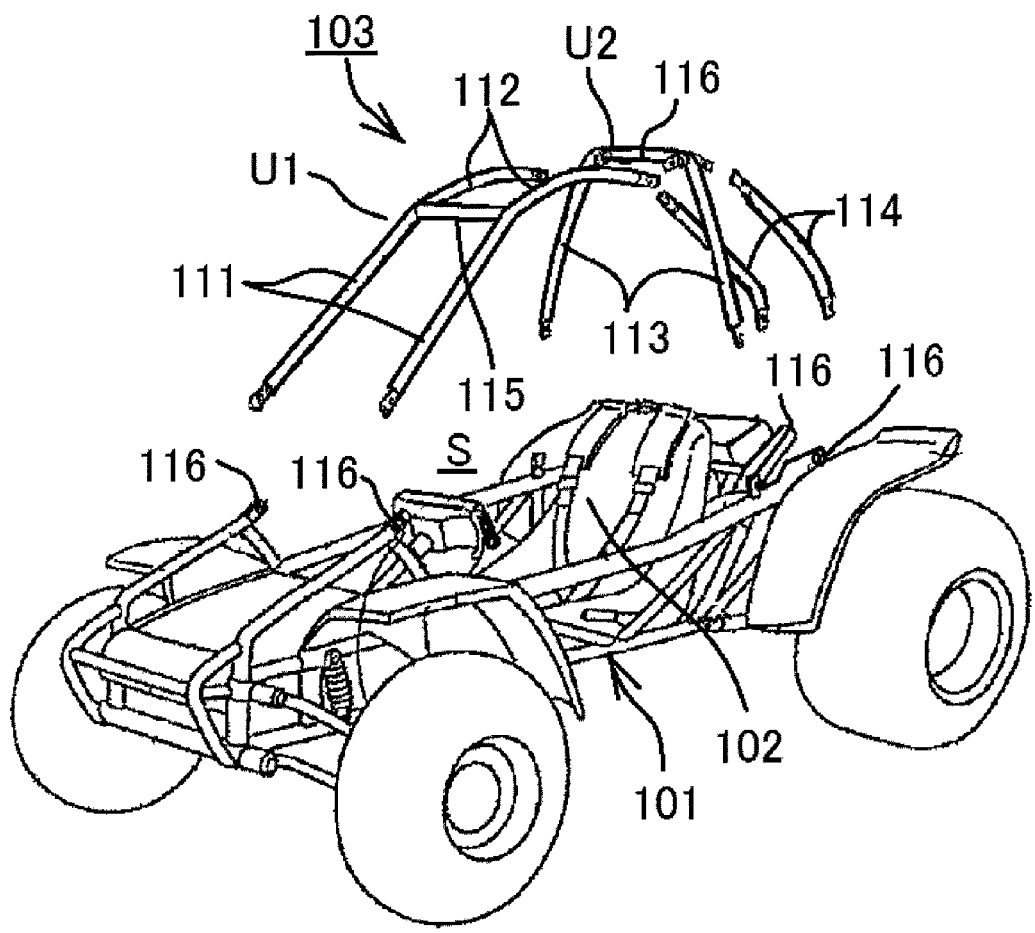
FIG. 9 is a perspective view of a conventional example.

FIG. 8 shows a structure of supporting the backrest 12, and the support bracket 57 integrally has a halved cylinder shape fitting portion 57a, and protruding pieces 57b protruding both upward and downward from the fitting portion 57a. The fitting portion 57a is fitted to a rear half part of the fourth cross member 34, and secured to the fourth cross member 34 by welding. A base plate 12a of the backrest 12 is abutted with the upward and downward protruding pieces 57b. By inserting two upper and lower tapping screws 69 into the protruding pieces 57b from the rear side, and screwing the tapping screws to the base plate 12a, the backrest 12 is supported on the fourth cross member 34 via the support bracket 57.

According to the R.O.P.S. structure of the above embodiment, the following advantages are obtained.

(1) The front pole portion 41, the rear pole portion 42, the mid pole portion 43, and the upper beam portion 44 are integrally formed as one side unit 30, and the pair of right and left side units 30 is detachably coupled by the cross members 31 to 34. Thus, the R.O.P.S. 10 is easily assembled, and furthermore, rigidity of the R.O.P.S. 10 is maintained.

(2) The front pole portion 41, the rear pole portion 42, the mid pole portion 43, and the upper beam portion 44 are integrally formed as one side unit 30. Thus, both the right and left side units 30 can be formed into a substantially planar shape, and a loading space can be compacted at the time of transporting parts.

(3) The mid pole portions 43 are arranged in the vicinity of the backrest 12, and the interval in the front and rear direction between the mid pole portions 43 and the rear pole portions 42 is set to be small as about ⅓ to ¼ of the interval in the front and rear direction between the mid pole portions 43 and the front pole portions 41. Thus, sides of the cargo bed 9 arranged on the rear side of the riding space S can be widely opened, so that a cargo can be easily loaded and unloaded from the sides. In particular, in a case where the cargo bed 9 has a dump truck structure, a manual dump truck operation can be readily performed from the sides of the vehicle.

(4) The first cross member 31 for coupling the front ends of the right and left upper beam portions 44 is formed into a substantially U shape when seen from the upper side in such a manner that the mid part in the lateral direction projects forward with respect to both the ends in the lateral direction. Thus, an upper end of the riding space S is extended forward, and at the time of getting in and out of a passenger, a space in the vicinity of a head of the passenger can be widely ensured, so that the passenger can readily get in and out.

(5) The fourth cross member 34 for coupling the right and left mid pole portions 43 is provided with the plurality of support brackets 57 for supporting the backrest 12 of the seat 11. Thus, the number of parts for supporting the backrest can be reduced.

(6) The third cross member 33 for coupling the right and left mid pole portions 43 is provided with at least one top anchor attachment portion 72 for the seatbelt. Thus, in a case of the three-seater bench type seat 11, a top anchor can be arranged in the vicinity of a shoulder of the passenger as the top anchor attachment portion of a central seating area, and this is favorable for attachment of the three-point seatbelt 13.

(7) The screen 56 for partitioning the cargo bed 9 and the riding space S is attached to the right and left mid pole portions 43. Thus, the screen 56 is easily attached.

(8) Among the plurality of pipe members forming the side unit 30, the front pole portion 41, the upper beam portion 44, and the rear pole portion 42 are formed into a U shape integral body by bending one pipe member. Thus, the number of parts for the R.O.P.S. can be reduced, and a manufacturing process or the R.O.P.S. can be reduced.

(9) The substantially U shape grip 37 is provided in the first cross member 31 in a front upper end of the R.O.P.S. 10. Thus, the grip is useful as a grip for the central seating area of the three-seater seat.

(10) Both the attached portions 31a, 32a of the first and second cross members 31, 32 for coupling the upper beam portions 44 are formed so as to have a substantially S shape section respectively. Thus, rigidity of the attachment portions of the cross members is maintained. Further, the upper wall portions 31a2, 32a2 of the attached portions 31a, 32a and the upper wall portions 44a2, 44b2 of the attachment portions 44a, 44b can be utilized as brackets for attaching the ceiling member. Thus, there is no need for specially providing attachment brackets.

OTHER EMBODIMENTS (1) The present invention can also be applied to a utility vehicle in which a plurality of independent type seats is arranged in a single row as described above in addition to the utility vehicle in which one bench type seat is provided in the riding space S.

(2) The present invention is not limited to the structure of the above embodiment but includes various modified examples considered within a range not departing from the content described in the claims.

What is claimed is:

1. A utility vehicle, comprising: a chassis frame; a single-row seat arranged on the chassis frame; and a R.O.P.S. surrounding a riding space in which the single-row seat is arranged, wherein:
the R.O.P.S. includes a right side unit and a left side unit, and a plurality of cross members for detachably coupling the right side unit and the left side unit,
each of the right side unit and the left side unit includes a front pole portion extending upward from a vicinity of a dashboard, an upper beam portion extending rearward from an upper end of the front pole portion, a mid pole portion extending downward to a vicinity of a rear part of the single-row seat from an intermediate part of the upper beam portion in a longitudinal direction of the utility vehicle, and a rear pole portion extending downward from a rear end of the upper beam portion, the front pole portion, the rear pole portion, and the upper beam portion being defined by a one-piece, bent pipe member having a circular cross section and being substantially U shaped in the longitudinal direction, and
a lower end of the front pole portion of the right side unit, a lower end of the mid pole portion of the right side unit, a lower end of the rear pole portion of the right side unit, a lower end of the front pole portion of the left side unit, a lower end of the mid pole portion of the left side unit, and a lower end of the rear pole portion of the left side unit, are individually and detachably coupled to the chassis frame.

2. The utility vehicle according to claim 1, wherein
an interval between the mid pole portion of the right side unit and the rear pole portion of the right side unit in the longitudinal direction is ⅓ to ¼ of an interval between the front pole portion of the right side unit and the mid pole portion of the right side unit in the longitudinal direction, and an interval between the mid pole portion of the left side unit and the rear pole portion of the left side unit in the longitudinal direction is ⅓ to ¼ of an interval between the front pole portion of the left side unit and the mid pole portion of the left side unit in the longitudinal direction.

3. The utility vehicle according to claim 1, wherein
one of the plurality of cross members couples a front end of the upper beam portion of the right side unit and a front end of the upper beam portion of the left side unit, and is substantially U shaped in a lateral direction of the utility vehicle so as to project forward from attachment portions at the front end of the upper beam portion of the right side unit, and the front end of the upper beam portion of the left side unit, respectively.

4. The utility vehicle according to claim 1, wherein
one of the plurality of cross members couples the mid pole portion of the right side unit and the mid pole portion of the left side unit, and is provided with at least one support portion for a backrest of the single-row seat.

5. The utility vehicle according to claim 1, wherein
one of the plurality of cross members couples the mid pole portion of the right side unit and the mid pole portion of the left side unit, and is provided with at least one top anchor attachment portion for a seatbelt.

6. The utility vehicle according to claim 1, wherein
a screen for partitioning a cargo bed and the riding space is attached to the mid pole portion of the right side unit and the mid pole portion of the left side unit.

7. The utility vehicle according to claim 1, wherein
the utility vehicle includes only one single-row seat.

8. The utility vehicle according to claim 1, wherein
no seat is between the mid pole portion of the right side unit and the rear pole portion of the right side unit in the longitudinal direction, and no seat is between the mid pole portion of the left side unit and the rear pole portion of the left side unit in the longitudinal direction.

9. The utility vehicle according to claim 1, wherein
the mid pole portion of the right side unit is substantially parallel to the rear pole portion of the right side unit, and the mid pole portion of the left side unit is substantially parallel to the rear pole portion of the left side unit.

10. The utility vehicle according to claim 1, wherein
the rear pole portion of the right side unit is substantially vertical, and the rear pole portion of the left side unit is substantially vertical.

\* \* \* \* \*